United States Patent
Juby et al.

(10) Patent No.: US 10,214,433 B2
(45) Date of Patent: Feb. 26, 2019

(54) BRINE TREATMENT SCALING CONTROL SYSTEM AND METHOD

(71) Applicant: Carollo Engineers, Inc., Costa Mesa, CA (US)

(72) Inventors: Graham John Gibson Juby, Irvine, CA (US); G. Adam Zacheis, Seal Beach, CA (US)

(73) Assignee: Carollo Engineers, Inc., Costa Mesa, CA (US)

(*) Notice: Subject to any disclaimer, the term of this patent is extended or adjusted under 35 U.S.C. 154(b) by 251 days.

(21) Appl. No.: 15/379,980

(22) Filed: Dec. 15, 2016

(65) Prior Publication Data

US 2017/0096351 A1 Apr. 6, 2017

Related U.S. Application Data

(62) Division of application No. 12/454,241, filed on May 13, 2009, now Pat. No. 9,561,471.

(51) Int. Cl.

| | |
|---|---|
| *B01D 61/02* | (2006.01) |
| *C02F 1/469* | (2006.01) |
| *B01D 61/42* | (2006.01) |
| *B01D 61/58* | (2006.01) |
| *C02F 1/44* | (2006.01) |
| *B01D 65/08* | (2006.01) |
| *C02F 1/52* | (2006.01) |
| *C02F 103/08* | (2006.01) |

(52) U.S. Cl.
CPC .......... *C02F 1/4693* (2013.01); *B01D 61/025* (2013.01); *B01D 61/027* (2013.01); *B01D 61/422* (2013.01); *B01D 61/58* (2013.01); *B01D 65/08* (2013.01); *C02F 1/441* (2013.01); *C02F 1/442* (2013.01); *B01D 2311/08* (2013.01); *B01D 2311/25* (2013.01); *B01D 2321/223* (2013.01); *C02F 2001/5218* (2013.01); *C02F 2103/08* (2013.01); *C02F 2201/4613* (2013.01); *C02F 2301/046* (2013.01); *C02F 2303/20* (2013.01); *C02F 2303/22* (2013.01)

(58) Field of Classification Search
CPC .................................................. B01D 61/025
See application file for complete search history.

(56) References Cited

U.S. PATENT DOCUMENTS

| | | |
|---|---|---|
| 4,036,749 A | 7/1977 | Anderson |
| 4,141,825 A | 2/1979 | Conger |
| 4,188,291 A | 2/1980 | Anderson |
| 6,030,535 A | 2/2000 | Hayashi et al. |
| 6,416,668 B1 | 7/2002 | Al-Samadi |
| 7,052,600 B2 | 5/2006 | McKay |

(Continued)

*Primary Examiner* — Peter Keyworth

(74) *Attorney, Agent, or Firm* — The Webb Law Firm

(57) ABSTRACT

A System for brine treatment scaling control in a water treatment system is described. In the system, a concentrated brine stream influent may be treated in an electrodialysis-reversal process to produce a concentrated brine stream effluent and a lower salinity diluent water, which may be potable water effluent. The concentrated brine stream effluent may be processed in a brine treatment scaling control system that may have a mixing vessel and a membrane filter with the mixing vessel seeded with calcium sulfate. A lowered salinity brine stream effluent may be produced for return to the electrodialysis-reversal process to allow operation at greater overall recovery and an elevated concentrated brine stream may be produced.

18 Claims, 2 Drawing Sheets

(56) References Cited

U.S. PATENT DOCUMENTS

| | | |
|---|---|---|
| 7,077,962 B2 | 7/2006 | Pipes |
| 2004/0055955 A1 | 3/2004 | Davis |
| 2004/0060823 A1 | 4/2004 | Carson et al. |
| 2004/0245177 A1 | 12/2004 | Pipes |
| 2005/0011832 A1 | 1/2005 | Awerbuch |
| 2005/0016922 A1 | 1/2005 | Enzweiler et al. |
| 2006/0060532 A1 | 3/2006 | Davis |
| 2007/0284252 A1 | 12/2007 | Ganzi et al. |
| 2008/0067125 A1 | 3/2008 | Wilkins et al. |
| 2008/0121585 A1 | 5/2008 | Mavis |

BRINE TREATMENT SCALING CONTROL SYSTEM AND METHOD

CROSS REFERENCE TO RELATED APPLICATION

This application is a divisional of, and claims priority to, U.S. patent application Ser. No. 12/454,241, filed May 13, 2009, the entire contents of which are herein incorporated by reference.

BACKGROUND OF THE INVENTION

This invention relates to systems and processes for controlling scaling material in brine treatment systems that may be used to produce potable water, recycled water, processed water and the like. Conversion of brackish and saline water may include a primary treatment using a reverse osmosis or electrodialysis-reversal system and the concentrate brine stream produced may be further treated in an electrodialysis-reversal system to increase potable and other type water production and further concentrate the brine stream produced. The new system and method treats the concentrated brine stream loop to continuously remove calcium sulfate to reduce the scaling properties of the concentrated brine stream and to allow for higher treatment system recoveries.

Current brackish and saline water treatment systems and methods may use a primary process such as reverse osmosis (RO) or electrodialysis-reversal (EDR) process with a secondary process such as an EDR process to treat a brine stream produced by the primary process. The resultant further concentrated brine stream may be disposed or wasted, or further treated with a zero liquid discharge process. A major limitation of water recovery for the secondary process for the brine stream may be the fouling of the secondary system due to scaling of the EDR membranes due to elevated levels of sparingly soluble salts, such as calcium sulfate, in the brine stream. Current methods to control scaling may include brine stream pre-treatment with chemicals that may be toxic or may include limiting the recovery. Calcium sulfate may be found in the brine stream when sulfuric acid has been used for scale control.

SUMMARY OF THE INVENTION

The present invention is directed to systems and methods for brine treatment scaling control in a water treatment system. A concentrated brine stream influent may be treated in an electrodialysis-reversal process to produce a more concentrated brine stream effluent and lower salinity diluent water, which may be potable water effluent. The more concentrated brine stream effluent may be processed in a brine treatment scaling control system that may have a mixing vessel and a membrane filter with the mixing vessel seeded with calcium sulfate. A lowered salinity brine stream effluent may be produced for return to the brine loop of the EDR process and an elevated concentrated brine stream may be produced.

These and other features, aspects and advantages of the present invention will become better understood with reference to the following drawings, description and claims.

DETAILED DESCRIPTION

The following detailed description represents the best currently contemplated modes for carrying out the invention. The description is not to be taken in a limiting sense, but is made merely for the purpose of illustrating the general principles of the invention.

Figure 1:
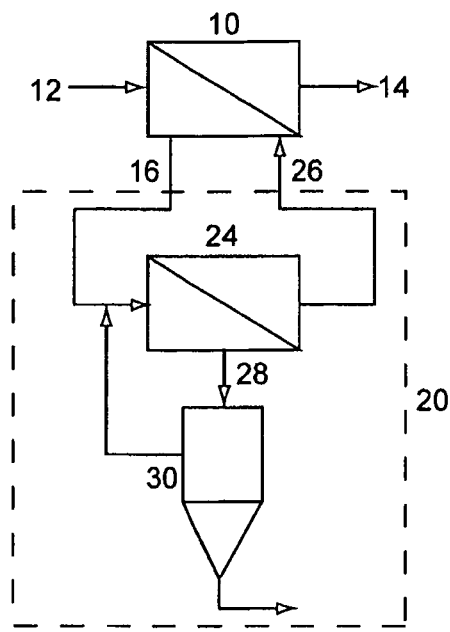
FIG. 1 illustrates a functional diagram of a brine treatment scaling control system in combination with an EDR brine stream secondary treatment system according to an embodiment of the invention.

Referring to FIG. 1, an EDR process 10 may receive an influent stream 12 influent which may be a concentrated brine stream, treated wastewater, groundwater, surface water, processed water and the like and may produce a potable water 14 effluent and a concentrated brine stream 16 effluent. The concentrated brine stream 16 effluent may be processed in a brine treatment scaling control system 20 that has a mixing vessel 30 and a membrane filter 24, that may be tubular, spiral, flat sheet or other similar filter that may accommodate a seed slurry feed. The brine treatment scaling control system 20 may return a lowered salinity brine stream 26 as make-up flow to the brine loop of the EDR process 10 concentrate circulating loop for further treatment.

The EDR process may transfer ions through membranes from a less concentrated solution to a more concentrated solution as a result of a flow of direct electric current. In an ionic solution in which two electrodes are immersed spaced apart, ions may begin to move toward each electrode when a direct current (DC) potential is applied to the electrodes. Positively charged ions (cations) may migrate toward the cathode, or negatively charged electrode, and negatively charged ions (anions) may migrate toward the anode, or positively charged electrode. In an EDR system several membranes may be positioned in the space between the electrodes to create water-tight compartments. Two types of membranes may be used; the generally identified anion transfer membranes that allow the passage of negatively charged anions, and the cation transfer membranes that allow the passage of positively charged cations. The two membrane types are placed between the electrodes in pairs and are impervious to water transfer.

The presence of the anion and cation membrane pairs may result in water compartments that alternately become either depleted or concentrated with ions when the direct current potential is applied. When the EDR system is properly manifolded, the membrane pairs will produce two separate flow streams, one that may be demineralized and one that may be more concentrated with minerals. In a typical application, several hundred combinations of demineralizing and concentrating compartments may be assembled in a membrane stack. The membranes may be separated by membrane spacers that allow space for water to flow across the membrane surfaces. A membrane stack may contain more than one pair of electrodes. The EDR system may be structured to allow the reversal of the direct current potential. The reversal may be done periodically to cause ions to migrate alternatively in opposite directions such that a compartment that was a demineralizing compartment may become a concentrating compartment and vice versa.

There may be two water process flow connections to a membrane stack. One connection may allow water to flow through the demineralization compartment of the membrane stack and the other connection may allow water to flow through the concentrating compartments of the membrane stack. The latter may be termed the brine stream concentrate loop or brine loop. There may also be connections to the electrode compartments isolated from the water treatment flow for flushing the electrode compartments.

The flow rate of the concentrate and demineralized water through the EDR membrane stack should be essentially equal. In order to save water and increase the recovery of the EDR system, most of the concentrate brine stream may be recycled via the brine loop in an amount that would prevent the least soluble mineral from precipitating avoiding scale formation on the membranes and in the brine loop. Discharging an amount of the brine stream concentrate to waste, and adding an equal amount of feed water to maintain the overall stream volume, controls the concentration level in the concentrate brine stream and the brine loop. Acid and/or other anti-scalent chemicals may usually be fed continuously to the circulating concentrate brine stream to reduce the potential for mineral scaling.

As the feed influent salinity to an EDR process increases, which may be the case when an EDR process is used as a secondary treatment step, the concentration of salts, and therefore the potential for scale formation in the brine stream concentrate loop increases. This condition may limit the recovery levels in an EDR process when used in a secondary treatment configuration.

As illustrated in FIG. 1 an EDR process 10 receives a concentrated brine stream 12 influent from a primary saline treatment system (not shown) and outputs a potable water 14 effluent and a concentrated brine stream 16 effluent from the brine loop. The concentrated brine stream 16 effluent may be filtered in a membrane filter 24, tubular, flat sheet or other similar filter that may accommodate seed slurry feed to output a lowered salinity brine stream 26 that may be returned to the brine loop of the EDR process 10 as recycled influent for further treatment. The tubular membrane filter 24 may also output an elevated concentrated brine stream 28 as compared to the lowered salinity brine stream 26.

The concentrated brine stream 28 effluent of the tubular membrane filter 24 may be mixed in a mixing vessel 30 that may contain calcium sulfate, gypsum crystals or other sparingly soluble salt crystals. The mixture may have a portion returned to the tubular membrane filter 24, a portion removed to maintain the materials balance in the seeded slurry process of the brine treatment system 20, and solids may be removed.

Figure 2:
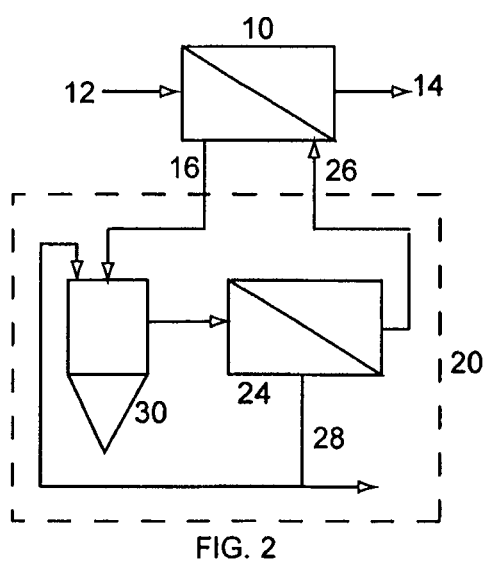
FIG. 2 illustrates a functional diagram of a brine treatment scaling control system in combination with an EDR brine stream secondary treatment system according to an embodiment of the invention.

Another configuration of the brine treatment system 20 is illustrated in FIG. 2. In this configuration, the concentrate brine stream 16 effluent from the brine loop of the EDR process 10 may be routed to the mixing vessel 30 of the seeded slurry process that may contain the calcium sulfate or gypsum crystals. The mixture produced may then be pumped to the membrane filter 24, tubular flat sheet or other similar filter that may accommodate seed slurry feed. The effluent lowered salinity brine stream 26 effluent product may then be returned to the brine loop of the EDR process 10 as recycled influent to allow continued operation of the EDR process at higher recovery and efficiency. The tubular membrane filter 24 may have membranes of the nanofiltration or reverse osmosis type. The elevated concentrated brine stream 28 effluent may become concentrated to a level that the stream may exceed the solubility threshold with respect to the calcium sulfate content. This calcium sulfate salt may precipitate on the surface of the gypsum crystals rather than on the membrane surface of the tubular membrane filter 24 and the gypsum crystals with precipitate may be returned to the mixing tank 30. A portion of the gypsum crystals may be removed from the system 20 as necessary to maintain the materials balance. The gypsum crystals may typically be at least 99.9 percent purity material that may be of commercial value for further use.

Figure 3:
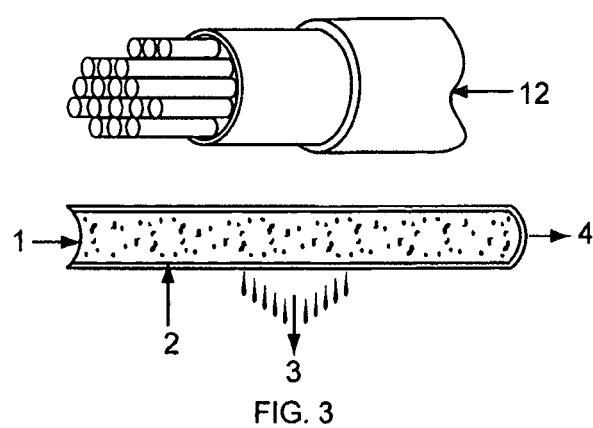
FIG. 3 illustrates a perspective schematic scaling control tubular membrane reverse osmosis process according to an embodiment of the invention.

Referring to FIGS. 1 through 3, a reverse osmosis tubular membrane filter as understood in the industry is illustrated with the calcium sulfate process annotated. In this configuration, the concentrate brine stream 1 of the treatment process may be combined with sparingly soluble salts and introduced into a series of tubular membranes 2 under pressure thus resulting in the passage of lower salinity water 3 through the membrane surface. Elevated concentrate, sparingly soluble salts and precipitating solids continue through the process 4 and out of the overall membrane pressure vessel 12 for recycling. The use of the brine treatment scaling control system 20 may result in: continuous removal of scaling compounds from an EDR process brine loop to aid in greater EDR process recovery; production of scaling solids that may be in an easily dewaterable form; reduction or elimination of EDR brine process blowdown and feed water or brine stream influent make-up cycling; treatment of higher concentrated brine in a smaller treatment volume; reduced costs for secondary brine treatment; reduced brine treatment chemical use; and reduced EDR process product salinity with greater salt rejection by the process.

While the invention has been particularly shown and described with respect to the illustrated embodiments thereof, it will be understood by those skilled in the art that the foregoing and other changes in form and details may be made therein without departing from the spirit and scope of the invention.

The invention claimed is:

1. A system for treating a brine stream, comprising:
    an electrodialysis-reversal system in communication with a concentrated brine stream source for receipt of a brine stream influent and production of a concentrated brine stream effluent and a lower salinity diluent stream effluent, wherein said electrodialysis-reversal system has a first process input connected to a demineralization portion of a membrane stack and a second process input connected to a concentrating portion of the membrane stack;
    a brine treatment scaling control system in communication with said electrodialysis-reversal system for receipt of said concentrated brine stream effluent and production of a lowered salinity brine stream effluent, wherein said brine treatment scaling control system has a mixing vessel and a filter; and
    a brine loop connected to said second process input of said electrodialysis-reversal system to return said lowered salinity brine stream effluent to said electrodialysis-reversal system.

2. The system as in claim 1, wherein said filter is adapted to output said lowered salinity brine stream effluent and an elevated concentrated brine stream effluent; and
    said mixing vessel is in communication with said filter to receive said elevated concentrated brine stream effluent.

3. The system as in claim 2, wherein said mixing vessel is adapted to return a portion of a mixture to said filter and output a portion of said mixture to the environment.

4. The system as in claim 1, wherein said concentrated brine stream effluent is received in said mixing vessel.

5. The system of claim 1, wherein said mixing vessel is in communication with said filter to route a mixture to said filter to produce said lowered salinity brine stream effluent and an elevated concentrated brine stream effluent.

6. The system as in claim 4, wherein said filter is adapted to output a portion of said elevated concentrated brine stream effluent to the environment.

7. The system as in claim 1, wherein said mixing vessel is seeded with one or both of calcium sulfate and gypsum crystals.

8. The system as in claim 1, wherein said mixing vessel is seeded with calcium sulfate.

9. The system as in claim 1, wherein said filter is a membrane filter.

10. The system as in claim 2, wherein said filter is a membrane filter.

11. The system as in claim 4, wherein said filter is a membrane filter.

12. The system as in claim 9, wherein said membrane filter is selected from the group consisting of a nanofiltration filter, a reverse osmosis filter, a tubular filter, a flat sheet filter, and a spiral configuration filter.

13. The system as in claim 10, wherein said membrane filter is selected from the group consisting of a nanofiltration filter, a reverse osmosis filter, a tubular filter, a flat sheet filter, and a spiral configuration filter.

14. The system as in claim 11, wherein said membrane filter is selected from the group consisting of a nanofiltration filter, a reverse osmosis filter, a tubular filter, a flat sheet filter, and a spiral configuration filter.

15. A system for treating a brine stream, comprising:
  an electrodialysis-reversal system in communication with a concentrated brine stream source for receipt of a brine stream influent and production of a concentrated brine stream effluent and a lower salinity diluent stream effluent, wherein said electrodialysis-reversal system has a first process input connected to a demineralization portion of a membrane stack and a second process input connected to a concentrating portion of the membrane stack;
  a brine treatment scaling control system in communication with said electrodialysis-reversal system for receipt of said concentrated brine stream effluent and production of a lowered salinity brine stream effluent, wherein said brine treatment scaling control system has a mixing vessel seeded with calcium sulfate and a membrane filter; and
  a brine loop connected to said second process input of said electrodialysis-reversal system to return said lowered salinity brine stream effluent to said electrodialysis-reversal system.

16. The system as in claim 15, wherein said membrane filter is adapted to output said lowered salinity brine stream effluent and an elevated concentrated brine stream effluent; and
  said mixing vessel is in communication with said membrane filter to receive said elevated concentrated brine stream effluent.

17. The system as in claim 15, wherein said concentrated brine stream effluent is received in said mixing vessel.

18. The system as in claim 15, wherein said mixing vessel is in communication with said membrane filter to route a mixture to said membrane filter to produce said lowered salinity brine stream effluent and an elevated concentrated brine stream effluent.

* * * * *